UNITED STATES PATENT OFFICE.

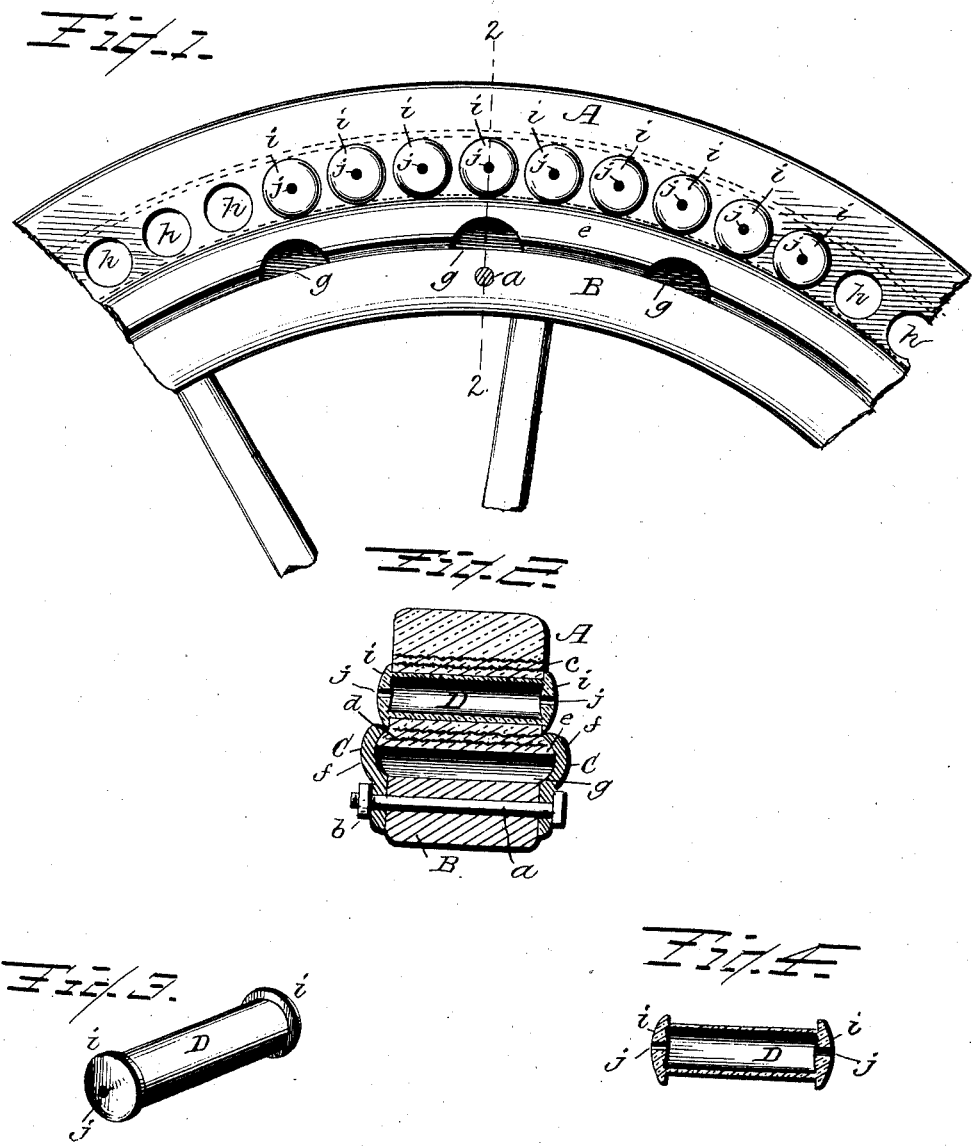

EDWARD L. PERRY, OF PATERSON, NEW JERSEY.

ELASTIC VEHICLE-TIRE.

No. 879,312.　　　Specification of Letters Patent.　　　Patented Feb. 18, 1908.

Application filed June 15, 1907. Serial No. 379,241.

*To all whom it may concern:*

Be it known that I, EDWARD L. PERRY, a citizen of the United States, residing at Paterson, in the county of Passaic and State of New Jersey, have invented certain new and useful Improvements in Elastic Vehicle-Tires; and I do hereby declare that the following is a full, clear, and exact description of the same, reference being had to the annexed drawings, making a part of this specification, and to the letters and figures of reference marked thereon.

The present invention more particularly refers to that class of rubber or other elastic tires for the wheels of automobiles and other vehicles in which the tire has a row or plurality of transverse perforations or openings therethrough to increase the flexibility of the tire and at the same time preserve its rigidity sufficiently to properly support the weight of the vehicle.

The perforations or openings above referred to had serious objections in that the ends thereof were open or exposed with the consequent result that the perforations or openings would frequently fill with mud and water and become objectionable to the users of the vehicle on account of the throwing of the mud and water by the rapid revolution of the wheel and also the sand, gravel and other sediment contained in the mud had a tendency to destroy the elastic properties of the tire by cutting through the webs between the perforations or openings. Should these perforations or openings be hermetically closed at the ends, a plurality of air chambers would be formed thus being equivalent to the ordinary pneumatic tire which is the purpose of the present invention to avoid.

After setting forth the above objections to the plurality of perforations or openings when exposed or open at the ends and those hermetically closed, the object and purpose of the present invention is to provide means whereby the openings are closed at the ends and at the same time enable the air to enter the perforations or openings and be expelled therefrom by the compression of the tire, as will be hereinafter described and claimed.

Figure 1 of the drawings is a side elevation of a portion of a vehicle wheel with my invention applied thereto, one of the clamping plates being removed. Fig. 2 a cross section taken on line 2 2 of Fig. 1 showing both of the clamping plates in position. Fig. 3 perspective view of the elastic hollow plug. Fig. 4 a longitudinal section thereof.

In the accompanying drawings A represents the vehicle tire of rubber or other similar elastic material and B the rim of the wheel to which said tire is secured by means of the clamping plates C and the bolt $a$ and nut $b$ or by any other means found most preferable, the tire being reinforced by layers of duck $c$ $d$ or other like material whereby the walls of the openings in the tire are strengthened.

The sides of the tire A have beads $e$ and the clamping plates C are concave upon their inner sides to correspond to the convexity thereof whereby the tire is securely held in contact with the rim of the wheel.

Any desirable means may be employed for holding the tire to the rim of the wheel, that shown being one of many means that may be used to accomplish the purpose.

The tire A upon its under side is formed with a plurality of transverse grooves $g$ which are closed at the ends by the clamping plates C, as shown in Fig. 2 of the drawings.

The grooves $g$ which are in contact with the rim of the wheel increase the resiliency of the tire and help to relieve any tremulous motion when traveling on rough roads.

The transverse perforations or openings $h$ instead of being open or exposed at their ends which was open to the objections hereinbefore referred to, are closed by a removable hollow elastic plug D as shown in detail in Figs. 3 and 4 of the drawings.

The plug D may be of any suitable size and diameter to correspond with that of the perforation or opening $h$ and is inserted therein by first compressing it and one of the heads $i$, and can be as readily removed when desired, the heads holding the plugs in position.

A vent $j$ extends through the heads $i$ of the plugs D whereby the air is enabled to pass into the hollow chamber of the plug from the outside atmoshpere and is also expelled by the compression of the tire. The ends of the perforations $h$ are closed by the plugs D which will prevent any mud or water entering without losing any of the resilient properties of the tire and at the same time allowing the air to pass through. Should any of the plugs D become injured or worthless from any cause, such plugs may be readily replaced by new ones after the injured or worthless plugs have been removed.

Having now fully described my invention, what I claim as new and desire to secure by Letters Patent, is:—

1. An elastic vehicle-tire having a plurality of transverse perforations or openings therethrough, and plugs having air vents and adapted to engage said perforations or openings, substantially as and for the purpose set forth.

2. An elastic vehicle-tire having a plurality of transverse perforations or openings, and removable headed vent-plugs adapted to fit in the perforations or openings, substantially as and for the purpose specified.

3. An elastic hollow plug for vehicle-tires closed at its ends and having perforations therethrough to form air vents, substantially as and for the purpose specified.

In testimony whereof I affix my signature in presence of two witnesses.

EDWARD L. PERRY.

Witnesses:
JOHN L. FLETCHER,
A. B. NICHOLS.